Z. B. WHEELER.
DRAFT EQUALIZER.
APPLICATION FILED DEC. 1, 1916.

1,334,202.

Patented Mar. 16, 1920.

Inventor
Zenas B. Wheeler,
By Talbert & Parker
Attorney

UNITED STATES PATENT OFFICE.

ZENAS B. WHEELER, OF WOODLAND, MAINE.

DRAFT-EQUALIZER.

1,334,202.  Specification of Letters Patent.  Patented Mar. 16, 1920.

Application filed December 1, 1916.  Serial No. 134,439.

*To all whom it may concern:*

Be it known that I, ZENAS B. WHEELER, a citizen of the United States, residing at Woodland, in the county of Washington and State of Maine, have invented certain useful Improvements in Draft-Equalizers, of which the following is a specification, reference being had therein to the accompanying drawing.

The present invention relates to improvements in draft equalizers, one object of the invention being the provision of a simple device of this character which can be readily placed in use, and which will equalize the draft pull exerted upon the object to be drawn, whether or not the pull of the draft animals is equal.

A further object of this invention is the provision of a device of this character which may be adapted for use upon two or more draft animals, and which is thoroughly efficient and practical in use.

Figure 1:
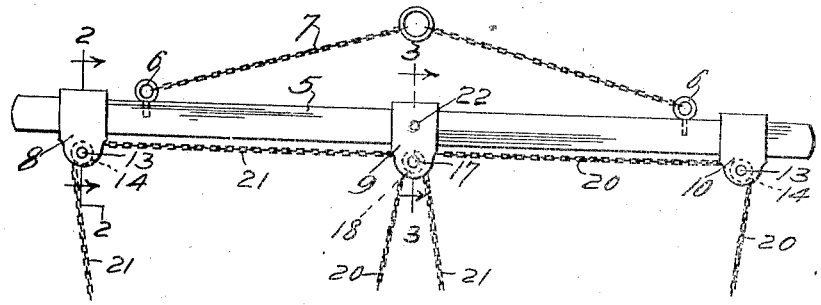
Figure 1 is a top plan view of the present device, showing the traces in operable relation.
Figure 2:
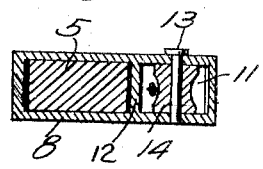
Fig. 2 is a section taken on the line 2—2 of Fig. 1.
Figure 3:
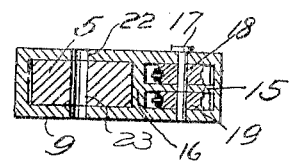
Fig. 3 is a section taken on the line 3—3 of Fig. 1.

Referring to the drawings, the numeral 5 designates the beam of the present equalizer having the two eye-bolts 6 attached to the rear face thereof, and in this instance having the chain 7 attached thereto. Any form of connection, however, may be employed.

The present beam is rectangular throughout its length, so that the three rectangular casings 8, 9 and 10 may be slidable thereon, the two outer casings 8 and 10 being each provided with the apertured sides 11 and the bridging connection 12, so that the shaft 13 and the pulley 14 may be properly supported and journaled therein.

The center casing 9 is provided with the three apertured sides and partition 15 and the bridging connection 16, so that the shaft 17 may be mounted therein and support the two pulleys 18 and 19.

In use, the trace or chain 20 is placed around one of the outer pulleys and the pulley 18, so that the ends of the trace are connected respectively to the near side of each draft animal, the remaining trace or chain 21 being passed through the remaining pulleys and its ends connected respectively to the off-side of each draft animal.

Figure 4:
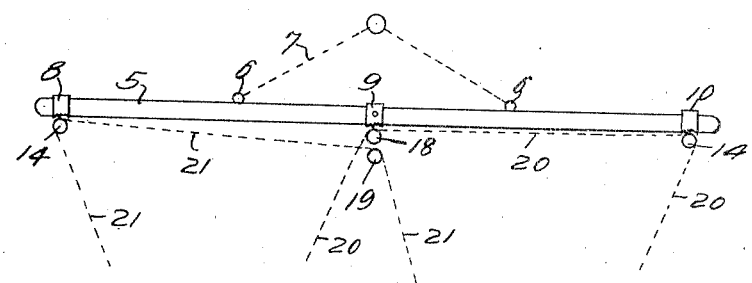
Fig. 4 is a diagram showing the arrangement of the traces for use in conjunction with two horses.

By this arrangement, as clearly shown in Fig. 4, the draft will be equalized upon the beam 5, so that regardless of the size of the two animals coupled for use the draft will be equalized.

By mounting the casings, as shown, upon the equalizing bar, the same are automatically clamped upon the draft equalizing bar, due to the particular shape thereof, but may be readily removed when desired or adjusted on said bar when the draft or strain thereon has been relieved. It will be noted that when a pull is exerted upon the stretches 20 and 21 of said chains the outer casings 8 and 10 will slightly rock on the beam to assume a forward convergent relation to each other for positive clamping action of said casings upon the equalizing bar so that there is no possibility of the slipping of the casings the length of the bar. The casing 9 has formed therein a hole 22 which registers with a hole 23 centrally in the equalizing bar 5, and received in said hole is a suitable coupling pin or other fastener for connecting the equalizer to a draft pole or tongue, as will be apparent.

When the equalizer is applied for use in connection with four draft animals the present arrangement may be carried out by merely increasing the length of the bar 5.

From the foregoing it is thought that the construction and manner of use of the equalizer will be clearly understood, and, therefore, a more extended explanation has been omitted.

Having thus described my invention, I claim:

In a draft equalizer, a beam of uniform cross sectional contour throughout its length, three open-sided cases formed with medial bridge walls, the beam projecting through the casings and having one face engaging said bridge walls, the middle casing being fixedly attached to the beam at its longitudinal center, the two outside casings being slidable along the beam for adjustment toward and away from the center casing, a pair of pulleys carried by the center casing outside of the bridge wall, a pulley carried by each of the outside casings outside of the bridge wall, and cables trained on each over the pulley of one outside casing and one of the pulleys of the center casing, whereby adjustment is provided for the outside casings but their movement precluded by the action of the cables because of their being rocked slightly by the latter due to a jerk or pull when the edges of the bridge walls bite into the beam to preclude movement of the casings therealong.

In testimony whereof I affix my signature.

ZENAS B. WHEELER.